United States Patent [19]

Orbesen

[11] Patent Number: 5,236,124
[45] Date of Patent: Aug. 17, 1993

[54] APPARATUS FOR AUTOMATICALLY VENTILATING BUILDINGS SUCH AS WINTER GARDENS, SUN LOUNGES, AND GREENHOUSES

[76] Inventor: Johannes H. Orbesen, Esterhojvej 57, DK-4550 Asnaes, Denmark

[21] Appl. No.: 838,296
[22] PCT Filed: Aug. 31, 1990
[86] PCT No.: PCT/DK90/00227
 § 371 Date: May 6, 1992
 § 102(e) Date: May 6, 1992
[87] PCT Pub. No.: WO91/03153
 PCT Pub. Date: Mar. 21, 1991

[30] Foreign Application Priority Data

Sep. 7, 1989 [DK] Denmark .................. 4431/89

[51] Int. Cl.⁵ ............................. F24F 7/00
[52] U.S. Cl. .................... 236/49.1; 251/250; 251/901; 454/258
[58] Field of Search ............ 236/49.1, 49.3, 49.4, 236/49.5, 99 R; 251/901, 326, 250; 454/258, 324; 47/17 R, 17 EC, 17 RM; 49/1, 360, 361, 362

[56] References Cited

U.S. PATENT DOCUMENTS

| | | | |
|---|---|---|---|
| 589,603 | 9/1897 | King | 236/49.1 |
| 1,618,792 | 2/1927 | Wood et al. | 236/49.5 |
| 1,663,352 | 3/1928 | Saoutchik | 49/361 |
| 1,940,191 | 12/1933 | Simonton | 49/362 |
| 3,669,350 | 6/1972 | White | 236/49.3 |
| 4,242,833 | 1/1981 | Maes, Jr. | 47/19 X |

FOREIGN PATENT DOCUMENTS 1043703 11/1958 Fed. Rep. of Germany .
2654223 6/1976 Fed. Rep. of Germany .
1352622 5/1974 United Kingdom .

*Primary Examiner*—Harry B. Tanner
*Attorney, Agent, or Firm*—Kenyon & Kenyon

[57] ABSTRACT

The invention relates to an apparatus for venting a building such as a greenhouse, by means of a sheet member which can be mounted in one or several openings of the building. The sheet member comprises a frame with four sides wherein are provided on at least two horizontal controls, which are formed as first rack bars. The frame has a horizontal edging and several parallel slats provided on at least one side hereof with a layer made of windproof and elastic material. A pinion is mounted in rotatable position opposite each guide on the edging, said pinion comprising a first and a second gear, the first gear being in mesh with the mentioned first rack bars, and the second being in mesh with teeth on the second rack mounted in movable position on the edging. A movement by the second rack bar in longitudinal direction will cause the second gear and consequently the first gear as well to rotate, whereby the edging is caused to move upwards or downwards via the first rack bars depending upon the direction of movement of the second rack bar. Consequently, the layer will either close off or clear an opening to the effect that air may vent the interior of the building.

4 Claims, 4 Drawing Sheets

APPARATUS FOR AUTOMATICALLY VENTILATING BUILDINGS SUCH AS WINTER GARDENS, SUN LOUNGES, AND GREENHOUSES

FIELD OF THE INVENTION

The present invention relates to a method of venting buildings provided with walls and roofs of transparent material, such as winter gardens, sun lounges or greenhouses, wherein an air current is created by a difference of temperature between at least two openings provided at different heights, and wherein the said openings can be opened or closed by means of sheet members, such as windows or hatches, which are activated by activation means.

BACKGROUND OF THE INVENTION

Certain types of buildings are provided with walls and roofs of transparent material in the form of glass or plastics in order to utilize the solar energy for heating the interior of the building in temperate climates. Such buildings are winter gardens, sun lounges or greenhouses.

Even in regions having a temperate climate, however, the solar energy may be so intense that the inside temperature of the building becomes undesirably high, and the building is then ventilated by opening at least one window, and in case a more intensive ventilation is called for by attempting to make a draught by opening windows located at two opposite sides of the building in order to take advantage of the difference in wind pressures. Another possibility is to utilize the differences of temperature inside the building by opening windows located at different heights, thereby taking advantage of the so-called chimney effect for ventilation of the building. In that case the windows may be provided either on a roof surface or in a wall, or in one wall, or in a first wall extending down from a roof surface, and a second wall extending down from the roof surface like a kind of chimney, which is particularly common in winter gardens built adjacent to a residential property.

It is well-known that the chimney effect is produced by the difference of density between cold and warm air, causing the warm air to rise and leave the building through the upper opening, whereas the rising warm air is replaced by colder air entering through the lower opening.

The above described effect is known for example from DE Printed Specification no. 1,008,517 and GB Patent Specification no. 1,352,622.

DE Printed Specification no. 1.008,517 describes a greenhouse, which is provided with openings at the bottom along the edge of one wall, which openings may be covered by flaps. In addition, the greenhouse has a ridge turret with openings, whereby the wind can blow horizontally through the ridge turret thereby producing an ejector effect, which may strengthen the chimney effect between the opening at the bottom along the edge of the greenhouse and the ridge turret.

GB Patent Specification 1,352,622 describes a greenhouse, which is provided with openings at the bottom along the edge of two opposite walls. These openings are fitted with sheet members, which are adapted to slide in vertical direction to open respectively close the openings, said openings being further provided with nozzles to spray water on the entering air in order to cool down the air by evaporation of the water and to increase the amount of steam and thus improve growth conditions for the plants in the greenhouse. Heated air can escape through openings in the roof. The flaps are slidable or can be controlled by means of a rack-and-pinion drive or with the aid of pneumatic cylinders, which may be activated by thermostats.

For rational operation greenhouses are usually very long, for example up to 100 meters. Using a rack-and-pinion drive to open and close the openings will result in considerable drawbacks, see for example DK Printed Specification no. 148,761, in view of the fact that the changing temperatures in the greenhouses on a day and night basis will cause the various shafts etc. to vary in length, requiring the provision of special measures in order to correct the engagement of the rack bars with other parts of the mechanism, thereby rendering these rack-and-pinion drives unduly expensive to use.

It is known to use activation means based upon a cylinder to open the windows of hotbeds or greenhouses, whereby the cylinder contains a fluid, which will expand or contract when heated respectively cooled, as a result of which a piston in the cylinder will move accordingly and thereby open or close the window openings, see for example DE Printed Specification no. 1,043,703.

The above mentioned specifications provide solutions, which are complicated and therefore unduly expensive to use, irrespective of whether they are to be used in very long greenhouses for cultivation of plants for commercial purposes, or whether they are to be used in a sun lounge or a winter garden comprising a few square meters only of a private residence.

SUMMARY OF THE INVENTION

It is an object of this invention to provide a method of venting buildings of the above described kind, wherein the chimmney effect is as high as possible, produced by very simple means, and can be adjusted automatically without human interference, and wherein the means are economical in use over a long period of time without maintenance.

This object is achieved by a method of the kind described in the introduction, and the novel features which characterize this invention are that at least the lower opening is provided with a sheet member having a layer of windproof and elastic material secured to at least one side of several horizontal lamellas or slats mounted at equal distance, said lamellas or slats being slidable in vertical direction by means of an activation device with a temperature detecting unit provided on the side of the slats facing the interior of the building.

By providing the lower opening with a curtain consisting of at least one layer of windproof and elastic material secured to the edge of horizontal lamellas or slats mounted at equal distance, a sheet member is produced, the height of which is simple to adjust in accordance with the desired ventilation, and the adjustment of which is independent of the wind pressures prevailing around the building, in addition to which the sheet member is inexpensive to produce as well as to maintain. By means of a temperature detecting unit provided on the inside of the curtain it is achieved that the unit will react to the inside temperature of the building only, and is protected against direct influence from the cold outside air.

A sheet member, which can be produced as a unit in standard sizes, is hereby provided, and the unit can be installed in a simple way, and at the same time it contains all of the means necessary for firm control of the horizontal slats. Largely, the length of the frame is arbitrary, and depending upon the length the frame may be provided with more than two controls for guidance of the slats.

A similar mechanism is known from U.S. Pat. No. 1,209,085, which provides a jack for raising an automobile. The known jack comprises a rectangular frame, which in each corner has a vertical rack bar, which is slidably guided in a bushing. The pair of rack bars in each side of the frame are in mesh with a first gear, which is mounted locked against movement on a shaft, which is embedded in rotatable position on the frame and has a second gear at one end, secured and locked against movement to the shaft as well. These two second gears are in mesh with a rack bar extending along one end of the frame and are slidably mounted in its longitudinal direction. The center of the rack bar is formed with a piston, which travels in a cylinder, and venting means have been provided to lead air from one end of the piston or the other to the effect that the rack bar will move, thereby causing the mentioned second set of gears to rotate, whereby the engagement of the first set of gears with the vertical rack bars will cause these to move up or down.

By using this known mechanism in connection with the present invention, a particularly advantageous parallel control of the slats is achieved, irrespective of their length and the number of controls provided in the frame, and the dimension of the mechanism in a direction at right angles to the plane of the frame can be kept very small.

A simple and very economical temperature detecting device is provided when using a hydraulic cylinder with a piston and a piston rod where the cylinder is connected to the slat carrying the shaft, and the piston rod is connected to the second rack bar.

When the cylinder unit is heated or cooled its length will change, causing the second rack bar to move. It is particularly advantageous to form the piston with a section smaller than that of the cylinder, since it is possible to achieve suitable variations of lengths as far as the cylinder unit is concerned by appropriate adaptation of the two sections.

The hydraulic cylinder, which is described in the above mentioned DE Printed Specification No. 1,043,703, is used to open or close a glass window, and the cylinder will act upon the window frame located on the edge, which is offset from the hinge, whereby the cylindrical unit of the said window is subjected to the influence of the prevailing wind directions in an uncontrolled way, which may cause either that the window will open more than intended in consideration of the prevailing temperature, or vice versa it may cause the window to open less than desired.

In the method according to the invention the full benefit is derived from a hydraulic cylinder which is unaffected by prevailing pressures and directions of the wind.

Finally, it is advantageous to shield off the hydraulic cylinder so as to protect it against the effect of the incoming cold air as much as possible, reacting only to the temperature prevailing in the building only.

The invention also relates to a sheet member for use in the implementation of the method according to the invention.

The advantages of the sheet member as well as the construction of this member will appear from the detailed description below.

The method as well as the sheet member are described in detail with reference to the drawing, which illustrate an embodiment of a sheet member, and in which:

DETAILED DESCRIPTION OF THE INVENTION

Figure 1:
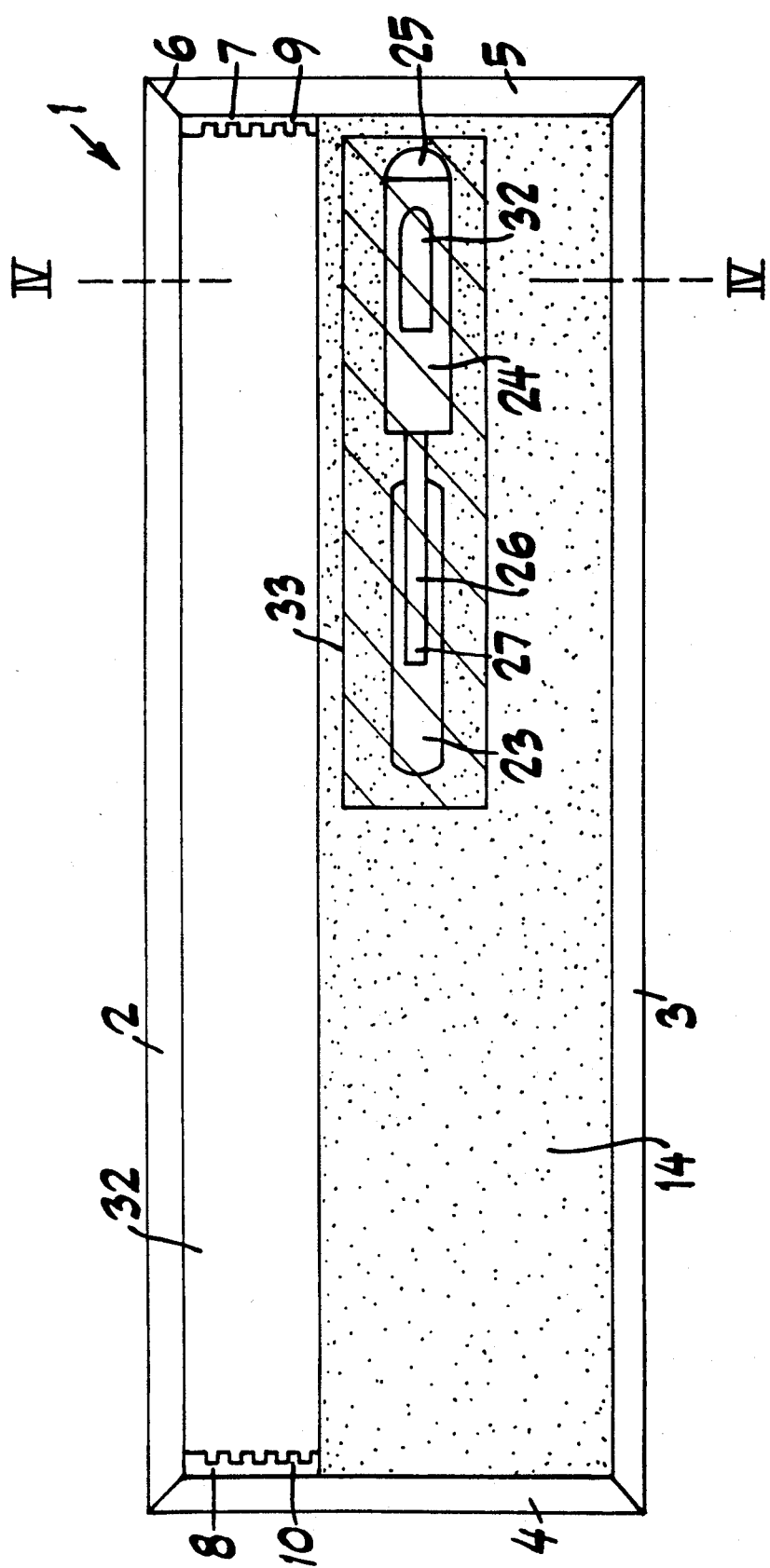
FIG. 1 is a side view of a sheet member according to the invention.
Figure 4A:
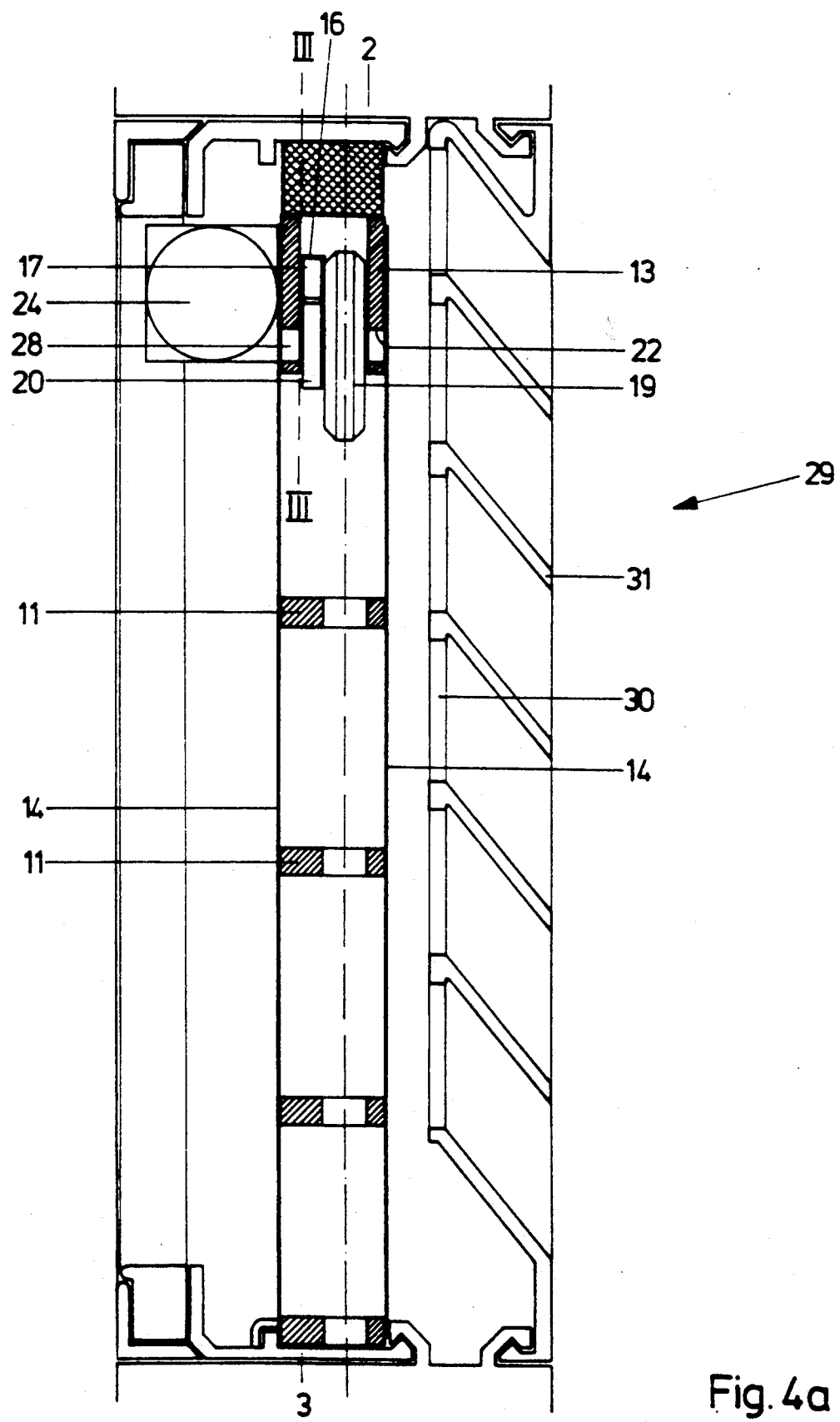
FIG. 4a and 4b are cross sections along the line IV—IV of the sheet member in closed and opened position respectively.
Figure 4B:
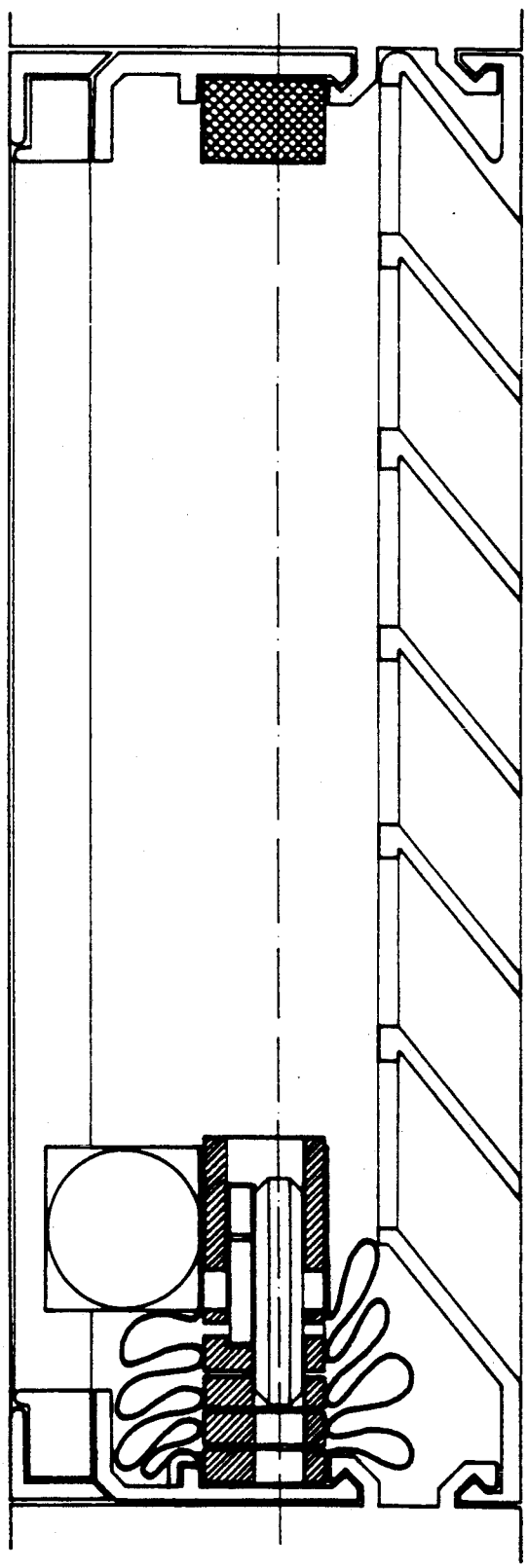

FIG. 1 illustrates a sheet member according to the invention, comprising a right-angled frame 1, which is preferably rectangular and consists of two long sides 2, 3 and two short sides 4, 5. The sides 2-5 can be made from any suitable material such as plastic, wood or metal. If a metal is used, aluminium is preferred, or an aluminium alloy, which is suitable for extrusion to the effect that the cross section of the sides 2-5 can be formed in an appropriate manner, in addition to which corrosion resistance can a be obtained as well when using aluminium. Each of the sides 2-5 may also be composed of profiles, as indicated in FIGS. 4a and 4b.

The four sides of the frame 1 may be assembled by means of weldings 6 or by appropriate connecting devices, such as screws and nuts or spikes. The ends of the sides 2-5 may be provided with cooperating grooves and tongues for mutual control of the ends, while the frame 1 may then be held together merely by inserting it into an opening, the dimensions of which correspond the outside measures of the frame 1.

The frame 1 is adapted to be installed in the wall of a building having walls and/or roof of transparent material to the effect that the building can be heated by solar energy, and preferably the frame 1 should be of a length corresponding to the entire length of the wall, and the sheet member in the lower opening is usually placed with one of its long sides 3 parallel to the ground, preferably disposed against the ground or the foundation of the building.

On the surfaces of the two short sides 4, 5 facing each other are provided two controls 7, 8, which on the edges facing each other are formed as rack bars with teeth 9, 10.

On the inside the frame 1 is provided with a curtain consisting of at least one layer 14 of windproof and elastic material of such dimension that the inside may be covered.

This layer 14 is secured to the side of an edging 13 provided on the edge of the layer 14, which is secured as well to the sides of a number of lamellas or slats 11 having preferably a rectangular section and having their larger sides directed in transverse direction in relation to the plane of the frame 1.

The slats 11 and the edging 13 are distributed at equal distances over the layer 14 and extend parallel with the long sides 2, 3 of the frame 1.

Preferably there is provided a layer 14 on each side of the slats 11 and the edging 13.

The slats 11 are provided with recesses 12, which are formed to engage slidably with the controls 7, 8 to the effect that the slats 11 may be caused to move vertically within the plane of the frame.

The edging 13 has recesses 12 as well corresponding to the recesses at the ends, however the edging 13 is formed differently as compared to the slats 11 as will be described in detail below.

The elastic layer 14 may for example be a woven fabric or a man-made material, only it must be pliable, when the distance between the slats 11 and the edging 13 decreases, or the slats are folded together face to face.

The slats 11 and the edging 13 may also be provided with one or more perforations 15 evenly distributed over the lengths of the slats so that the frame if made with a considerable length, may be fitted with additional controls for the slats 11 and the edging 13 within the plane of the frame and to absorb possible wind pressure against the layer 14.

Figure 2:
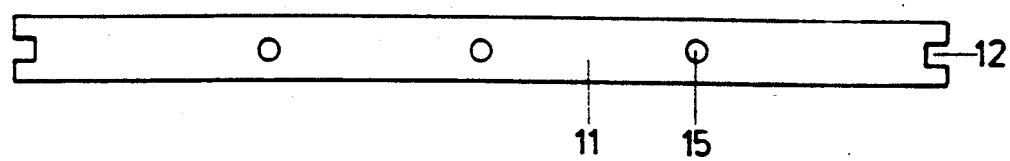
FIG. 2 is a plan view of a slat, which is part of a curtain of the sheet member illustrated in FIG. 1.
Figure 3:
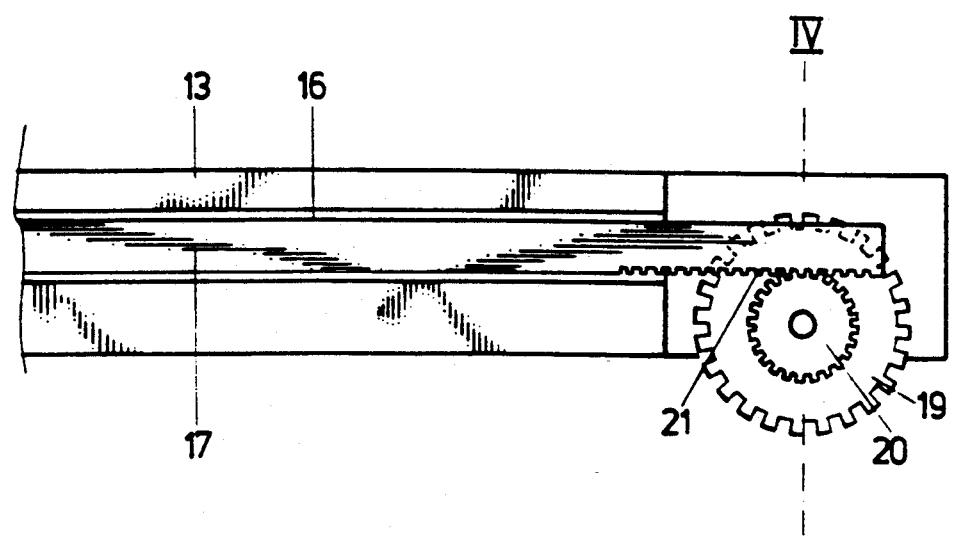
FIG. 3 is a longitudinal section of one end of an edging forming the edge of a curtain of the sheet member.

Like the controls 7, 8 these additional controls may be formed with teeth 9, 10. If so, the perforations 15 will be of rectangular shape. If the guides are without teeth, they will normally have a circular section, and so the perforations 15 will be circular as shown in FIG. 2.

The lower slat 11 is secured to one of the long sides 3 of the frame 1, for example by means of screws in perforations 15, which may not be utilized, or other appropriate openings, and it will be understood that a movement upwards of the edging 13 wil cause the layer or the layers 14 to expand or stretch out so that the inside of the frame is covered, and that a movement of the edging 13 downwards will cause the layer or the layers 14 to fold, resulting in the maximum opening 32 possible between the edging 13 and the upper long side 2 of the frame 1, the inside of the opening 32 being defined alone by the possibility of folding together the slats 11 and the edging 13. The slats remain secured to the plane of the frame 1 by the interaction between the controls 7, 8 and the recesses 12 at the ends of the slats 11 and the mentioned recesses of the edging 13.

The edging 13 has a longitudinal channel 16 to receive the second rack bar 17 which is slidable in the longitudinal direction of the channel 16.

The rack bar 17 is provided with teeth extending over a limited length at the ends of its edge or surface facing downwards.

The recesses extend further from the ends of the edging 13 than the recesses 12 of the slats 11. The recesses thus are adapted to receive a pinion consisting of a first 19 and a second gear 20 of different sizes, mounted surface to surface and in mutual locked position on a shaft 28, which can be received rotatably in a bore 22 extending through the recess and at right angles to the plane of the frame 1.

The bore 22 is placed in the edging 13 such that the first gear 19 having the larger diameter of the two gears 19, 20, can interact with the teeth 9, 10 of the controls 7, 8, and the second gear 20 can interact with the teeth 21 at the ends of the second rack bar 17.

A movement by the second rack bar 17 in the channel 16 therefore, will cause the gear 20 and consequently the first gear 19 as well to rotate as a result of the interaction between the teeth 21 and the second gear 20.

Since the first gear 19 is in mesh with the teeth 9, 10 of the controls 7, 8, this rotation of the first gear 19 will cause the end in question of the edging 13 to move upwards or downwards depending upon the direction of movement of the second rack bar 17.

When the teeth 9, 10 are mounted on the edges of the controls 7, 8 facing each other as shown in FIG. 1, it is necessary to expand the recess at one end of the edging 13 to such an extent that a reversing gear, which is not illustrated, can be inserted between the teeth 21 and the second gear in order to reverse the direction of rotation of the pinion, which is provided at this end of the edging 13, for parallel displacement of the edging 13 in the frame 1.

If such intermediate reversing gear is undesirable, the controls 7, 8 should be mounted so that both teeth 9, 10 face the same end of the frame 1.

When selecting the size of the teeth 9, 10 and 21 as well as the diameters and sizes of the teeth of the gears 19, 20 an adaptation may be made to the vertical displacement of the edging 13 from a given horizontal displacement of the rack bar 17.

Furthermore, it may be convenient to mount the controls provided with teeth at a distance from the two short sides 4, 5 of the frame, to the effect that a larger longitudinal displacement of the second rack bar 17 can be achieved, without risking its ends running against the short sides 4, 5 of the frame. At the same time the possibility of adapting the sizes of the teeth 9, 10 and the gears 19 and 20 will improve when placing the controls this way. If controls with teeth 9, 10 are mounted at a distance from the short sides 4, 5, the edging 13 opposite each control must be provided with a set of gears 19, 20, and the tooth rack 17 must have teeth to interact herewith Furthermore, the edging 13 has a longitudinal perforation 23 between the channel 16 and the side of the edging which is adapted to face the interior of the building when the frame 1 has been installed. This perforation 23 is of a length corresponding to the maximum movement possible of the second rack bar 17, and a corresponding perforation has been provided in the layer 14.

The numerous channels and recesses of the edging 13 can advantageously be effected by having the edging 13 consist of several layers of slats.

On the above mentioned side of the edging 13 and the layer 14 a hydraulic cylinder 24 has been provided, which is secured appropriately to the edging 13, for example by means of a screw 25 at the closed end of the cylinder. The hydraulic cylinder 24 is covered by a screen 33.

The cylinder 24 has an inside piston 32 and a piston rod 26 connected hereto extending out of the cylinder and is connected to the rack bar 17 with its free end, whereby the connection may have been provided by a stud extending from the piston rod through the perforation 23 into the rack bar 17.

The hydraulic cylinder 24 is filled with a fluid having a rather high thermal expansion coefficient to the effect that the volume of the fluid may vary as much as possible concurrently with the variations of the fluid temperature.

The inside piston 32 mentioned is a so-called diving piston, which is to say that its cross section is considerably smaller that of the hydraulic cylinder 24.

As a result, even an insignificant change of the fluid volume will cause a comparatively big longitudinal movement of the inside piston of the cylinder.

The piston rod 26 is sealed in a conventional manner in relation to the cylinder 24 by means of sealing devices, which are not illustrated in the drawing.

The outside of the frame 1 is fitted with a grid 29 having horizontal openings 30 for admittance of the outside air into and through the frame 1. In order to prevent precipitation and solar rays from reaching into the frame the grid 29 is provided with louvres 31 extending from the upper edge of each of the openings 30, and sloping downwards and outwards, and in addition the frame 1 may be provided with a fine-meshed net on either side, which is not illustrated in the drawing, in order to keep out insects.

The sheet member according to the invention works in the following way:

When rays of sunlight enter through the transparent material forming the walls and roof of the building, the temperature inside the building will increase.

As a result of this increase of temperature the fluid contained in the hydraulic cylinder 24 and the inside piston will warm up and expand to the effect that the piston rod 26 is pushed in a direction out of the cylinder. Through the stud 27 which moves freely in the longitudinal perforation 23 of the edging 13 and the layer 14, the second rack bar 17 will be included as well in the same direction in relation to the edging 13 and the teeth 21, as a result of their engagement with the second gear 20, and the intermediate reversing gears, if any, will cause the two first gears 19 to rotate to the effect that the edging 13 is moved downwards while still remaining parallel to the long sides 2, 3 of the frame 1.

The curtain is folded together leaving an opening 32 between the upper long side 2 of the frame 1 and the edging 13.

At the same time, and possibly even a little earlier, temperature detecting means have caused the second opening provided higher in the building to open to the effect that some of the heated air can escape. An air current is now created through the opening 32 of the frame 1, as a result of which the temperature will gradually assume a degree which is determined in part by the ventilation and in part by the intensity of the sunlight and a temperature of the fluid in the cylinder 24 corresponding hereto.

The above described movements of the device is a comparatively slow process, and the device will find an opening 32 of reasonable size which will ensure maintenance of a predetermined temperature inside the building.

When solar radiation ceases resulting in the temperature inside the building dropping below the predetermined level, the device will again close the opening 32.

What is claimed is:

1. A member for venting buildings, in particular winter gardens, sun lounges or greenhouses, comprising a rectangular frame (1) and at least one layer (14) of windproof material said at least one layer is movable by means of a temperature detecting activation mechanism (24, 26) between a closed position, wherein the opening of the frame (1) is filled up by the layer (14), and an open position, wherein there is a space between one side (2) of the frame (1) and a first edge of the layer (14), the opposite second edge of which is closely connected to the frame (1), said activation mechanism (24, 26) being mounted on the side of the frame (1) which is adapted to face the interior of the building, characterized in that the frame (1) has at least two controls (7, 9) extending parallel to the first two sides (4, 5) of the frame and are connected to its two other sides (2, 3), that the layer (14) is elastic and has one side secured to several lamellas or slats (11, 13), which are mounted at equal distance and parallel to the two other sides (2, 3) of the frame, said lamellas or slats having perforations (12, 13) to slidably receive the controls (7, 8) that each control (7, 8) is formed as a first rack bar (9, 10), which is in mesh with a first gear (19) being secured locked against movement to a second gear (20), and that the first (19) and the second gear (20) are mounted rotatably on a shaft (28) provided in one of the slats (13), the second gear (20) being in mesh with a second rack bar (17) extending in a channel (16) in the slat (13) carrying the shaft and is adapted to be moved by the activation mechanism (24, 26) in its longitudinal direction.

2. Member according to claim 1, characterized in that the first gear (19) has a larger diameter than that of the second gear (20).

3. Member according to claims 1 or 2, characterized in that the temperature detecting activation mechanism (24, 26) is a hydraulic cylinder (24), which is secured to the slat (13) carrying the shaft and has a piston with a cross section smaller than that of the cylinder (24), and that the piston has a piston rod (26), which is connected to the second rack bar (17).

4. Member according to claim 3, characterized in that the hydraulic cylinder (24) is covered by a screen.

* * * * *

UNITED STATES PATENT AND TRADEMARK OFFICE
CERTIFICATE OF CORRECTION

PATENT NO. : 5,236,124

DATED : August 17, 1993

INVENTOR(S) : Johannes H. ORBESEN

It is certified that error appears in the above-identified patent and that said Letters Patent is hereby corrected as shown below:

On the title page, item [57]
ABSTRACT, line 5, change "wherein" to --on which-- and delete "on" after "provided".

ABSTRACT, line 8, change "hereof" to --thereof--.

Column 1, line 29, after "for" insert a comma.

Column 1, line 64, change "respectively" to --and--.

Column 2, line 20, after "heated" and insert --or cooled--; insert a comma after "respectively".

Column 2, line 21, delete "cooled,".

Column 3, line 39, after "cooled" insert a comma.

Column 3, line 54, change "in consideration of" to --in response to--.

Column 3, line 55, after "vice versa" insert a comma.

Column 3, line 65, insert a period after "building" and delete "only".

UNITED STATES PATENT AND TRADEMARK OFFICE
CERTIFICATE OF CORRECTION

PATENT NO. : 5,236,124

DATED : August 17, 1993

INVENTOR(S) : Johannes H. ORBESEN

It is certified that error appears in the above-identified patent and that said Letters Patent is hereby corrected as shown below:

Column 4, line 5, change "drawing," to --drawings,--.

Column 5, line 7, after "well" insert a comma.

Column 5, line 21, after "frame" insert a comma and delete "and".

Column 5, line 53, between "first" and "19" insert --gear--.

Column 6, line 53, change "hereto" to --thereto--.

Column 7, line 8, after "frame" insert a comma.

Column 7, line 46, change "hereto" to --thereto.--.

Column 8, line 10, after "material" insert a comma.

Column 8, line 27, after "(7, 8)" insert a comma.

UNITED STATES PATENT AND TRADEMARK OFFICE
CERTIFICATE OF CORRECTION

PATENT NO. : 5,236,124
DATED : August 17, 1993
INVENTOR(S) : Johannes H. ORBESEN It is certified that error appears in the above-identified patent and that said Letters Patent is hereby corrected as shown below:

Column 8, line 29, change "secured" to --securely--.

Column 8, line 30, after "first" insert --gear--.

Signed and Sealed this

Fourth Day of July, 1995

Attest:

BRUCE LEHMAN

*Attesting Officer*    *Commissioner of Patents and Trademarks*